3,445,275
GLASS CONTAINER COATED WITH A LUBRICATING FILM COMPRISING CARNAUBA WAX AND POLYVINYL ALCOHOL
Burton S. Bogart, Forest Hills, N.Y., assignor to Anchor Hocking Glass Corporation, Lancaster, Ohio, a corporation of Delaware
No Drawing. Filed May 25, 1965, Ser. No. 458,762
Int. Cl. C03c 17/28, 23/00, 17/00
U.S. Cl. 117—124          8 Claims

ABSTRACT OF THE DISCLOSURE

A glass container coated with a lubricating film that is formed by evaporation of the water from an aqueous dispersion of carnauba wax and polyvinyl alcohol in a dispersing medium comprising an alkali or alkanolamine salt of a long chain fatty acid.

---

This invention relates to a novel coating composition for application to glass surfaces as a lubricant and in order to improve receptivity to adhesives used for labelling. More particularly, the invention concerns an aqueous dispersion of carnauba wax and polyvinyl alcohol to be applied to glass surfaces, the method of preparing and using the same, and glass surfaces coated therewith.

The adverse effects of glass-to-glass contacts upon the strength of glass articles such as containers and flat glass are well recognized, and considerable attention has been devoted to the development of protective coatings which will provide lubrication and at the same time minimize contact damage. There have been proposed for this purpose various polymeric substances, some of which have been adapted to be applied directly, and others, such as silicones and polyethylene, in the form of aqueous emulsions. The latter types of coatings have not been satisfactory in regard to receptivity toward the commonly used label adhesives. It is also known to improve scratch resistance of glass surfaces by exposure to the vapors of metallo-organic compounds of aluminum, titanium, or zirconium, at elevated temperatures, whereby the vapors are pyrolyzed to form a metal oxide coating on the glass surface as disclosed in U.S. Patent 2,831,780. As far as coating glassware intended for food or cosmetic use is concerned, few of the known preparations have met the approval of the Food and Drug Law.

In accordance with the present invention, there is provided a novel dispersion type coating composition for application to the surfaces of glass articles which exhibits improved performance characteristics in regard to lubricity and also in regard to the acceptance of labelling adhesives.

The coating dispersion of the invention includes as its active ingredients carnauba wax and polyvinyl alcohol, dispersed with the aid of a suitable dispersing agent.

Carnuba wax or Brazil wax is a hard water insoluble amorphous wax obtained from the leaves of the wax palm, *Copernicia cerifera*, melting at about 84°–86° C., and having a sp. gr. of 0.995.

The polyvinyl alcohol employed is a substantially cold water insoluble (88% hydrolyzed) type which can be colloidally dispersed, having a sp. gr. of about 1.21 to 1.31, such types being sold commercially under the designations Elvanol and Gelvatol. A preferred type is Elvanol 51–05.

The dispersing agent employed in accordance with the invention is a salt of oleic acid. Suitable salts include alkali metal oleates, particularly sodium oleate. Alkanolamine salts may also be employed, preferably triethanolamine oleate.

The coating composition of the invention, when applied to glass surfaces, and particularly to glass container surfaces, provides a permanent type of coating, which is clear and water-white, and which is receptive to most types of label adhesives. It also reduces the tendency of container abrasion by glass-to-glass contact during processing. The composition is readily applied by spraying or brushing to glassware emerging from the low temperature end of an annealing lehr. The reduction in abrasion results in retention of a high proportion of the original container strength.

The protective characteristics of this coating including its reduction of abrasion by glass-to-glass contact are particularly important as they allow all handling operations to be carried out at significantly increased speeds. This, in effect, increases the operating speeds at which the various units of the processing equipment may be run including filling, sealing, and inspection machines.

An additional advantage of the coating compositions of the invention lies in their ability to be applied upon an undercoat or substrate of a previously deposited scratch resistant layer, such as the oxide of titanium, zirconium, or aluminum, described previously. The carnauba wax-polyvinyl alcohol coating provides extra necessary lubricity, while at the same time the water resistance of the combination is enhanced. A further advantage is that the coating shows good wet as well as dry lubricity, which is a feature unique for most coatings for this purpose, inasmuch as coatings showing good wet lubricity usually also show poor label adhesion characteristics. The coating of the present invention combines all these advantageous features. It also has a film characteristic which is one of exceptional clarity, enhancing the brilliant appearance of the container.

The proportions of the various ingredients of the coating compositions of the invention should preferably be confined within the ranges indicated in order to obtain the desired performance and for maximum stability of the preparations.

The coating composition comprises a combination of two separately prepared portions, one of which is designated carnauba wax base and the other polyvinyl alcohol base. The first is a mixture of carnauba wax, dispersing agent, and water, having the following approximate ranges of composition:

Carnauba wax base A

| | | |
|---|---|---|
| Carnauba wax | lbs | 15–20 |
| Oleic acid | grams | 1350–1650 |
| Triethanolamine | do | 1000–1300 |
| Water | gallons | 5.0–7.0 |

Make up to 60 to 100 lbs. or alternatively.

Carnauba wax base B

| | | |
|---|---|---|
| Carnauba wax | lbs | 15–20 |
| Sodium oleate | grams | 1000–2500 |
| Water | lbs | 60–100 |

The second portion is a mixture of polyvinyl alcohol and water, having the approximate composition ranges shown:

Polyvinyl alcohol base

| | Lbs. |
|---|---|
| Polyvinyl alcohol (Elvanol 51–05) | 12–20 |
| Soft water | 60–70 |
| Make up to final weight of | 72–90 |

The foregoing carnauba wax and polyvinyl alcohol bases are mixed together in the proportion of about 50% by weight of each, to form the coating composition of the invention.

The use of more than the indicated proportion of wax, while it enhances the permanence of the film, does not contribute to lubricity, and has the disadvantage of reducing acceptability of the surface to adhesives. Increasing the polyvinyl alcohol content reduces the permanence of the coating by rendering it more water soluble, and also has little or no effect on lubricity, although it may improve receptivity toward adhesives.

The general method of preparation of the coating dispersions of the invention comprises the steps of forming an aqueous suspension of the ingredients in the proportions indicated, and subjecting the suspension to treatment in a colloid mill until a dispersion is produced in which the particles are so finely comminuted that they are of colloidal dimensions.

The practice of the invention is illustrated by the following example:

EXAMPLE 1

There were separately prepared 80 lbs. each of the following two coating dispersion bases:

Carnauba wax base

| | |
|---|---|
| Carnauba wax | 16 lbs. 11 oz. |
| Oleic acid | 1512 grams. |
| Triethanolamine | 1209 grams. |
| Water | 6.5 gallons. |
| Make up to final weight of | 80 lbs. |

Polyvinyl alcohol base

| | Lbs. |
|---|---|
| Polyvinyl alcohol (Elvanol 51-05) | 16 |
| Soft water | 64 |
| Total weight | 80 |

The foregoing bases were admixed in the proportions of 1:1 by weight.

The coating dispersion was applied to glassware at a dilution between about 35 to about 100 parts of water per 1 part of said mixture of equal parts by weight of the two bases. The diluted dispersion is applied to glassware preferably at a temperature of about 250° to about 300° F., which is about the temperature corresponding to the emergent end of an annealing lehr, in finely divided form, preferably by spraying.

When subjected to standard physical tests, the coating dispersion of the invention of the above example showed the following test characteristics:

TABLE 2

| | Carnauba wax-polyvinyl alcohol |
|---|---|
| (1) Appearance | Clear |
| (2) Film strength | Good |
| (3) Average dry lubricity | [1].159 |
| (4) Average wet lubricity | [1].305 |
| (5) Hot water test | |
| (A) Average lub. before test | [1].144 |
| (B) Average lub. after test | [1].166 |
| (C) Difference in lub. | [1].022 |
| (6) Film strength after hot water test | Fair |
| (7) Percent of label adhesion-average | 44.7 |

[1] These figures are the coefficient of friction measurements. The lower this figure, the better is the lubricity. Jars not coated have a coefficient of friction when rubbed against one another or another solid surface of from .7 to .8.
The percent of label adhesion represents the percent area of label firmly adhering to the glass surface after the glass has been hot water tested.

What is claimed is:

1. A glass container coated with a lubricant film for protection against contact damage and for increased adhesive receptivity, said film being formed by the evaporation of water from a first colloidal dispersion comprising about one part by weight of a second colloidal dispersion dispersed in from about 35 to about 100 parts by weight of water, said second colloidal dispersion comprising from about 15 to about 20 parts by weight of carnauba wax, from about 12 to 20 parts by weight of a substantially cold water insoluble polyvinyl alcohol, from about 2.2 to about 5.5 parts by weight of an alkali metal salt of oleic acid and from about 100 to 130 parts by weight of water.

2. The container of claim 1 wherein the alkali metal salt of oleic acid is sodium oleate.

3. The container of claim 1 wherein the carnauba wax and the polyvinyl alcohol are present in approximately equal proportions.

4. The container of claim 1 wherein the alkali metal salt of oleic acid is sodium oleate and wherein the carnauba wax and the polyvinyl alcohol are present in approximately equal proportions.

5. A glass container coated with a lubricant film for protection against contact damage and for increased adhesive receptivity, said film being formed by the evaporation of water from a first colloidal dispersion comprising about one part by weight of a second colloidal dispersion dispersed in from about 35 to about 100 parts by weight of water, said second colloidal dispersion comprising from about 15 to about 20 parts by weight of carnauba wax, from about 12 to about 20 parts by weight of a substantially cold water insoluble polyvinyl alcohol, an alkanolamine salt of oleic acid formed by the reaction of from about 3 to about 3.6 parts by weight of oleic acid and from about 2.2 to about 2.9 parts by weight of an alkanolamine and from about 100 to about 130 parts by weight of water.

6. The container of claim 5 wherein the alkanolamine salt of oleic acid is triethanolamine oleate.

7. The container of claim 5 wherein the carnauba wax and polyvinyl alcohol are present in approximately equal proportions.

8. The container of claim 5 wherein the alkanolamine salt of oleic acid is triethanolamine oleate, and the carnauba wax and polyvinyl alcohol are present in approximately equal proportions.

References Cited

UNITED STATES PATENTS

| 2,306,790 | 12/1942 | Meigs | 260—23 |
| 2,346,124 | 4/1944 | Dew | 252—49.5 |
| 2,511,695 | 6/1950 | Canfield | 260—28.5 |
| 3,296,174 | 1/1967 | Pickard | 260—29.6 |

OTHER REFERENCES

Biehn et al.: "Polyvinyl Alcohol as an Emulsifying Agent," I. & E.C., vol. 40, No. 8, pp. 1449–1450 (1948).

HOSEA E. TAYLOR, JR., *Primary Examiner.*

R. A. WHITE, *Assistant Examiner.*

U.S. Cl. X.R.

117—72, 94; 260—23, 28.5, 29.6